United States Patent [19]

Kulkarni

[11] Patent Number: 5,731,859
[45] Date of Patent: Mar. 24, 1998

[54] CHOLESTRIC LIQUID CRYSTAL DEVICE AND A METHOD FOR ITS MANUFACTURE

[75] Inventor: Sudhakar N. Kulkarni, Fremont, Calif.

[73] Assignee: Kaiser Electronics, San Jose, Calif.

[21] Appl. No.: 593,069

[22] Filed: Dec. 29, 1995

[51] Int. Cl.$^6$ .................... G02F 1/1337; G02F 1/141; G02F 1/13

[52] U.S. Cl. .................... 349/128; 349/135; 349/183; 349/187

[58] Field of Search .................... 349/183, 128, 349/135, 187

[56] References Cited

U.S. PATENT DOCUMENTS

| | | | |
|---|---|---|---|
| 4,394,070 | 7/1983 | Brown et al. | 349/165 |
| 5,064,697 | 11/1991 | Takiguchi et al. | 349/183 |
| 5,141,785 | 8/1992 | Yoshinada et al. | 349/187 |
| 5,164,741 | 11/1992 | Kaneko et al. | 349/183 |
| 5,173,342 | 12/1992 | Sato et al. | 349/135 |
| 5,447,655 | 9/1995 | Sato et al. | 252/299.01 |
| 5,555,114 | 9/1996 | Narita et al. | 349/98 |

FOREIGN PATENT DOCUMENTS 5-346585  12/1993  Japan .

*Primary Examiner*—Anita Pellman Gross
*Attorney, Agent, or Firm*—Marvin H. Kleinberg; Arant, Kleinberg, Lerner & Ram, LLP

[57] ABSTRACT

A single substrate polymeric cholesteric liquid crystal (CLC) device useful in display applications such as for high efficiency polarizers and color filters is created by a process that coats a first substrate with a polyimide layer and a second substrate with an amorphous fluoropolymer layer. Both layers are buffed and liquid CLC material is placed between the grooved layers. After annealing, the amorphous fluoropolymer coated substrate is removed, leaving the CLC material bonded to a single substrate.

19 Claims, 2 Drawing Sheets

CHOLESTRIC LIQUID CRYSTAL DEVICE AND A METHOD FOR ITS MANUFACTURE

BACKGROUND OF THE INVENTION

1. Field of the Invention

This invention is related to liquid crystal display devices and, more particularly, a single substrate polymeric cholesteric liquid crystal ("CLC") device which can be used in display applications such as high efficiency polarizers and color filters and a method for making it.

2. Background of the Invention

Display systems have become an important aspect of current technology. Indeed, display systems are included in, for example, projection systems and vehicle display systems.

Some display systems utilize a liquid crystal display ("LCD"). In these systems, sheet polarizers are used to process light. A conventional sheet polarizer absorbs all light that is not transmitted as polarized light. Thus, there is concern regarding the lifetime of a high brightness projection system or an active matrix LCD ("AMLCD"). A failure of the polarizer may render the AMLCD display system useless as the information transmitted to the user by the display cannot be seen or is difficult to see due to a diminution in the contrast.

To address this problem, display systems have been developed that utilize polarizers made from polymer CLCs. These polarizers have the advantage of reflecting rather than absorbing that portion of the light which is not transmitted as polarized light. The reflected light can be collected and redirected to improve the overall light collection efficiency, which can lead to a decrease in the power consumption by the projector or display system.

Like conventional LCDs, CLC devices currently in use utilize a plurality of substrates. CLCs have typically been sandwiched between two supporting substrates having microgrooves. The positioning of substrates on both sides of the CLC layer is necessary to align the CLC crystals, as the CLC will not become completely aligned when coated onto a single grooved substrate.

Although multiple substrates create CLC devices that have aligned crystals, the requirement of at least a pair of substrates for each CLC device makes the resulting device heavy and bulky. In devices, such as, for example, color filters, a stack of several CLC devices may be necessary. This can become problematic as the resulting device can become quite large due the many substrates required for the several CLC layers.

None of the current methods of manufacturing CLCs addresses the bulk and weight problem as a consequence of the need for multiple substrates during the manufacturing process. There is a need in the industry for a manufacturing method that can produce aligned CLCs that are adequately supported, but that reduce the size and weight of the resulting CLC device.

SUMMARY OF THE DISCLOSURE

According to a preferred embodiment of the instant invention, a CLC device is made by a method that includes the steps of cleaning a pair of substrates, coating the inner surface of a first substrate with polyimide and coating the inner surface of a second substrate with amorphous fluoropolymer. The inner surfaces of the first and second substrates are then buffed, or rubbed, such that parallel lines, or microgrooves, are formed in the coated inner surfaces.

A plurality of spacers are then placed on the polyimide coating of the first substrate. The spacers determine the thickness of the CLC material. After the spacers have been positioned, the CLC material is layered onto the polyimide coating between the spacers and the substrate is then heated to about 90° C.

The second substrate is then placed adjacent the CLC material such that the inner surface of the second substrate contacts the CLC material. The two substrates are then pressed and sheared such that the CLC molecules align in the direction of microgrooves and excess CLC material is extruded.

The CLC device is then heated until the CLC crystals anneal. The CLC device is then cooled, after which the second substrate, with the amorphous fluoropolymer coating, is removed from the CLC material, leaving the CLC material, the polyimide and the first substrate as a unitary structure. This unitary structure may now be used either alone or in a stack with other, single substrate CLC layers as a polarizer, a color filter, or in other comparable applications in which liquid crystal layers are useful.

Accordingly, an object of the invention is to reduce the weight of polymeric CLC devices by decreasing the number of substrates and their thickness without compromising performance parameters.

Another object of the invention is to extend the life of display systems and projection systems by providing a CLC polarizer that does not absorb the unpolarized component of the transmitted polarized light.

A further object of the invention is to reduce the power required in projection systems in which polarizers are employed by collecting and redirecting the reflected component of the applied light to improve overall light collection efficiency.

The novel features which are characteristic of the invention, both as to structure and method of operation thereof, together with further objects and advantages thereof, will be understood from the following description, considered in connection with the accompanying drawings, in which preferred embodiments of the invention are illustrated by way of example. It is to be expressly understood, however, that the drawings are for the purpose of illustration and description only, and they are not intended as a definition of the limits of the invention.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

Figure 1:
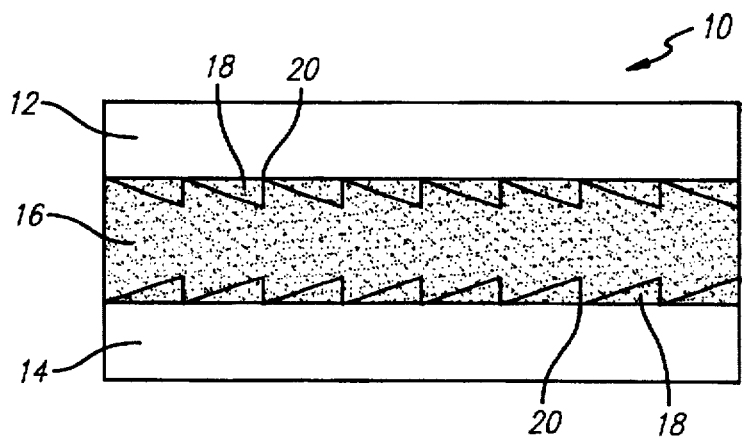
FIG. 1 is a side view of a prior art double substrate CLC device.

A prior art CLC device 10 is shown in FIG. 1. As can be seen, there is a first substrate 12, a second substrate 14 and a layer of CLC material 16. A polyimide coating 18 is applied to the inner surfaces and is buffed to provide microgrooves 20. As can be appreciated, smoking several of the prior art CLC devices will create a large bulky device.

According to a preferred method for manufacturing a CLC 11, according to the present invention, and as shown in FIG. 2, including FIGS. 2a–2f, a first substrate 22 and a second substrate 24, each having an inner surface 26, an outer surface 28, a first end 30 and a second end 32, are first cleaned. The first and second substrates 22, 24 generally are rectangular, although other shapes, such as, but not limited to, a circle, a square or polygon, are suitable. The substrates 22, 24 are made from a material capable of withstanding temperatures of about 200°–400° C., including, but not limited to, glass.

In preferred embodiments, the thickness of the substrates 22, 24 range from 5 to 10 mil. In contrast, substrates currently in use for CLC devices are typically about 40 mil. It has been found that the thickness of the substrate adversely affects polarization efficiency and contrast ratio and that thinner substrates improve these factors. In one preferred embodiment, the substrates 22, 24 are glass sheets 5 mil thick.

Figure 2A:
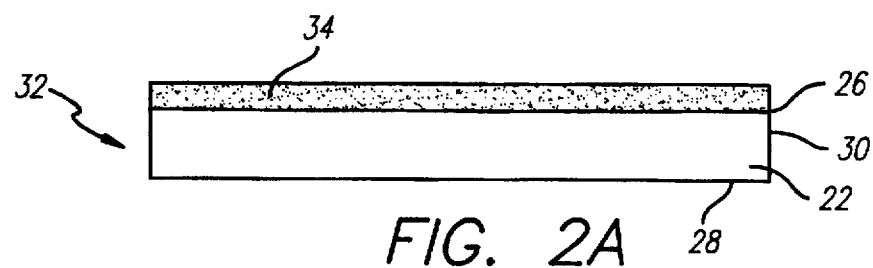
FIG. 2a is an idealized side sectional view of a first substrate having a polyimide surface.

After the substrates 22, 24 are cleaned, the inner surface 16 of the first substrate 22 is coated with polyimide 34, as seen in FIG. 2a. If the substrate has been adequately cleaned, the polyimide 34 will evenly adhere and uniformly spread onto the substrate surface 26. Any material capable of creating a surface upon which the CLC material can align during the manufacturing process is suitable to coat the inner surface 16 of the first substrate 22.

Many materials have been used to create the surface for the CLC material, including, for example, silicon monoxide polyvinyl alcohol, silicon dioxide and polystyrene. Although these materials are capable of creating a suitable surface for the CLC material, these materials do not provide for a consistent reproduction of the CLC devices.

In some preferred embodiments, the polyimide 34 is combined with a solvent to reduce the thickness of the polyimide layer. In these embodiments, the solvent is removed during the curing by evaporation.

In one preferred embodiment, a 6% solution of a polyimide 34 in a solvent comprising NMP (1-methyl-2-pyrolidinone) is used. This 6% solution is spin coated onto the inner surface 26 of the first substrate 22 to a depth of approximately 1000 Angstroms. The polyimide 24 coated substrate is then cured by heating it to at least 250°–400° C. in an oven for about 60 minutes.

Next, the inner surface 26 of the second substrate 14 is coated with amorphous fluoropolymer 36, commonly known as Teflon® AF that can conform to the shape of the inner surface 26 of the second substrate 24. In a preferred embodiment, the amorphous fluoropolymer 36 is spin coated onto the inner surface 26 of the second substrate 24 to a depth of approximately 1000 Angstroms and cured by heating to 150°–160° C. in an oven for about 20 minutes.

Figure 2B:
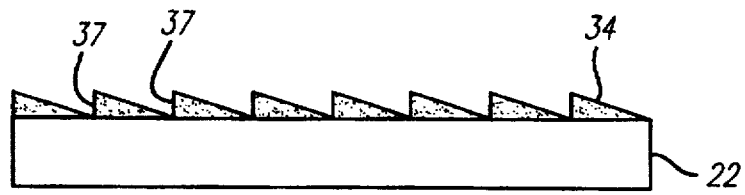
FIG. 2b depicts the substrate of FIG. 2a after buffing.

The inner surface 26 of the first and second substrates 22, 24 are then buffed, or rubbed, to create relatively parallel lines or microgrooves 37, in the coating of polyimide 34 and amorphous fluoropolymer 36 as shown in FIG. 2b. The microgrooves 37 are important as they serve as templates on which the cholesteric liquid crystal molecules can align when the crystals are sandwiched between the two substrates. Because CLC material 40 is too brittle to create a CLC device directly onto a substrate, some material must be used between the CLC and the substrate surface such as polyimide.

In preferred embodiments, a rubbing machine can be used to create the microgrooves in the surface coating. The buffing or rubbing creates microgrooves 37 that essentially cover all of the inner surfaces 26 of the first substrate 22 and second substrate 24. In the preferred embodiment, microgrooves 37 which are approximately 15 to 20 Angstroms deep are created by a rubbing machine set at approximately one pound of pressure for one minute.

Figure 2C:
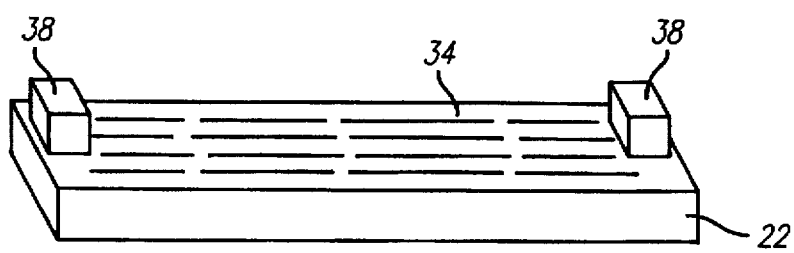
FIG. 2c is a perspective view of the substrate of FIG. 2b with a pair of spacers, prior to the addition of CLC material and a second substrate.

As shown in FIG. 2c, a pair of spacers 38 are then placed on the polyimide 34 at the ends 30, 32 of the first substrate 22. The height of the spacers 38 determine the CLC thickness. In a preferred embodiment, each spacer 38 is 7 microns thick. The first substrate 22 is then heated to about 95° C.

One method of preparing the CLC material includes the steps of dissolving the CLC material in tetrahydrofuran ("THF") and filtering the THF through, for example, a 0.2 micron filter to remove any particulate contaminants. The solution of CLC and THF is then placed in a dish and heated on a hot plate or in an oven, with a suitable exhaust, at about 80°–100° C., to evaporate the THF. Any air entrapped in the CLC material is then removed by placing the dish in a vacuum oven at 140° C. for about 15 minutes or until air bubbles stop evolving.

Figure 2D:
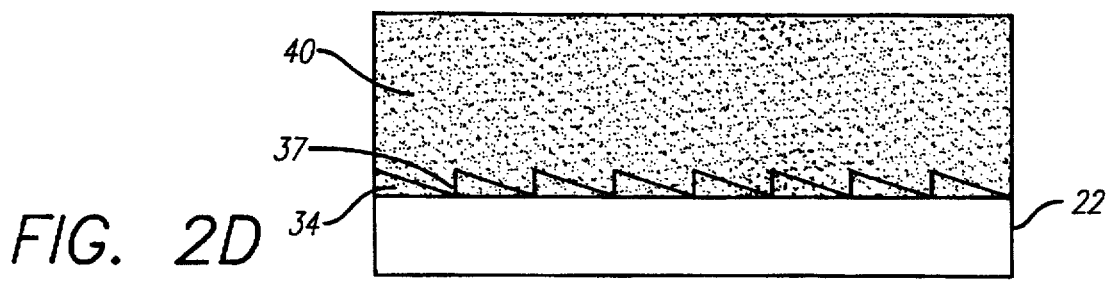
FIG. 2d is a view of the substrate of FIG. 2b with CLC material.

The CLC material 40 is then spread onto the heated buffed polyimide surface 34 between the spacers 38 as shown in FIG. 2d. The heating of the substrate 22 with the buffed polyimide surface 34 aids in the spreading of the CLC material 40.

Figure 2E:
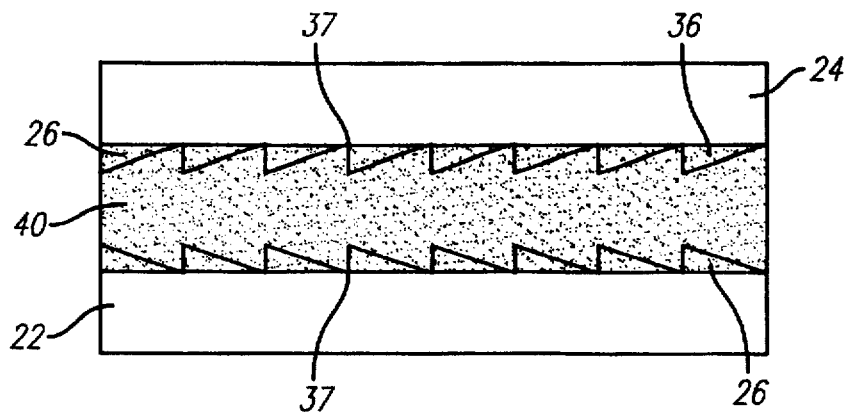
FIG. 2e is an idealized side sectional view of a preferred embodiment of the invention, showing CLC material between two buffed substrates.

The inner buffed surface 26 of the second substrate 24 is then placed in contact with the CLC material 40. The CLC material is sheared and pressed by the inner surfaces 26 of the first and second substrates 22, 24 until it distributes evenly between the first and second substrates 22, 24. The microgrooves 37 in the inner surfaces 26 aid in aligning the CLC material 40 with the inner surface 26 of the substrates 22, 24. As shown in FIG. 2e, a "sandwich" of the first substrate 22, the polyimide 34, the CLC material 40, the amorphous fluoropolymer 36, and the second substrate 24 is formed.

The resulting "sandwich" is then heated to anneal the CLC material 40 to the polyimide 34. Temperatures for annealing range from about 95° C.–160° C. for time periods of ranging from 15 to 30 minutes. Any device capable of reaching temperatures of about 95° C.–160° C. such as, but not limited to, hot plates and ovens, are suitable to anneal the "sandwich." In one preferred embodiment, the "sandwich" is heated to approximately 150° C. for about 30 minutes by placing the "sandwich" on a hot plate.

Figure 2F:
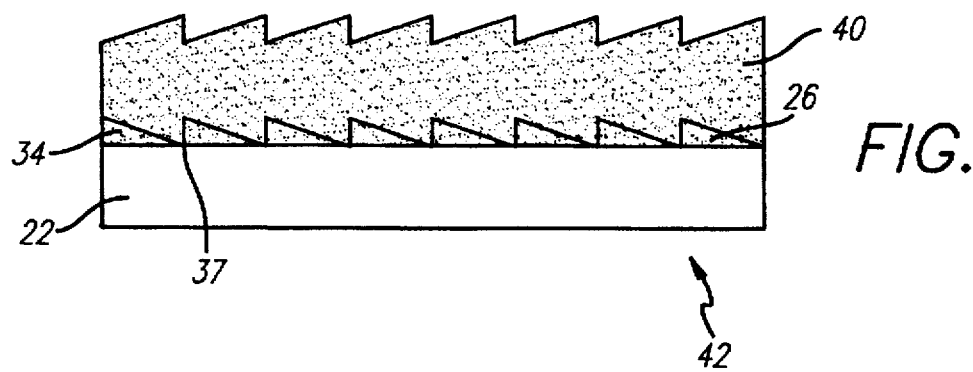
FIG. 2f is a side view of the device of FIG. 2e, after removal of the amorphous fluoropolymer coated substrate.

After the "sandwich" has been annealed, it is removed from the heating element and cooled. Once the "sandwich" is cooled, the second substrate 24 with amorphous fluoropolymer 36 is removed from the CLC material 40 such that the CLC material 40 remains affixed to the polyimide 34 and the inner surface 26 of the first substrate 22, as shown in FIG. 2f.

CLC devices created by this method are beneficial in that the size of the resulting CLC device 42 is reduced. Thus, the weight of the CLC device 42 is reduced. Despite the reduction in the size and weight, there is no compromise in the performance of the CLC device 42. Rather, the performance of the CLC device 42 improves over the bulkier, heavier prior art counterparts.

Table 1 compares a single substrate device of the present invention with the prior art two-substrate device. As shown in Table 1, a higher polarization efficiency and a higher contrast ratio result by eliminating substrates and by reducing their thickness.

TABLE 1

|  | Polarization Efficiency | Contrast Ratio | Transmittance |
|---|---|---|---|
| Single X Substrate | 99.0 | 61.2 | 22.3 |
| s | 1.05 | 35.8 | 2.1 |
| n | 29 | 29 | 29 |
| Prior Art X Process | 96.5 | 17.8 | 21.5 |
| s | 0.94 | 6.2 | 2.3 |
| n | 22 | 22 | 22 |
| Student t test | 8.8 | 5.6 | 1.3 |

X̄- Average value
s- standard deviation
n- number of data elements

Figure 3:
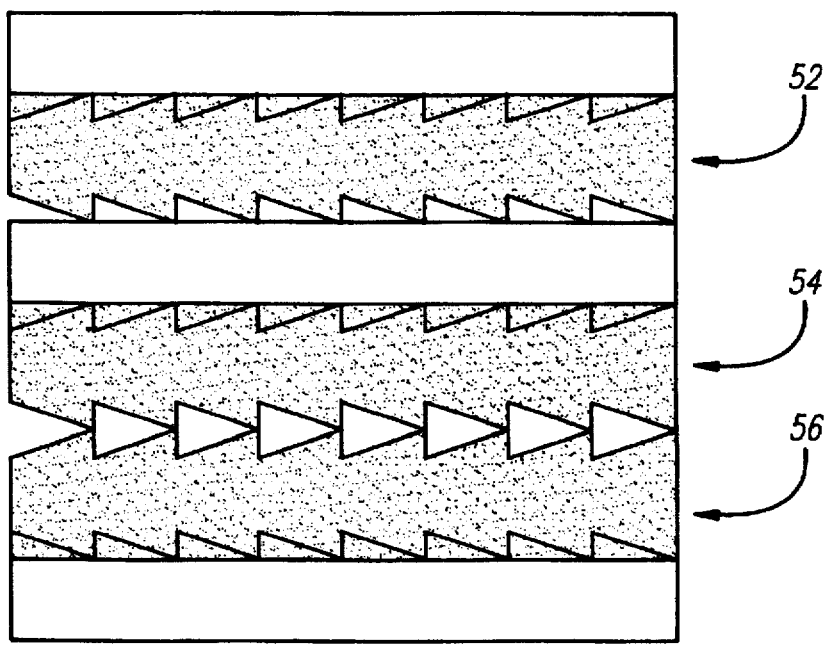
FIG. 3 is a side view of an embodiment of the invention having three stacked CLC devices.

FIG. 3 illustrates a preferred embodiment of the invention in which three CLC devices 52, 54, 56 of different wavelengths, or colors, have been stacked. The stacking of devices can create, for example, a polarizer or a color filter. As shown in FIG. 3, only three, rather than six substrates have been employed; thus, reducing the size and weight of the stacked element.

Although the foregoing describes the invention with a preferred embodiment, this is not intended to limit the invention. Rather, the foregoing is intended to cover all modifications and alternative constructions falling within the spirit and scope of the invention.

What is claimed:

1. A liquid crystal display component for use in manufacturing a cholesteric liquid crystal device comprising:

a first substrate and a second substrate, each substrate having an inner surface and an outer surface, the inner surfaces of the first and second substrate facing each other, the first substrate being optically clear;

the inner surface of the first substrate having a clear polyimide coating cured thereon and the inner surface of the second substrate having a fluoropolymer coating cured thereon, the polyimide coating and the fluoropolymer coating having parallel microgrooves therein; and a polymeric cholesteric liquid crystal film sandwiched between said polyimide coating and said fluoropolymer coating, said second substrate and fluoropolymer coating being removable from the combination leaving the polymeric cholesteric liquid crystal film adhered to said polyimide coating, said polymeric cholesteric liquid crystal film outer surface having the inverted image of the microgrooves from the previously attached fluoropolymer coating.

2. A method of manufacturing a cholesteric liquid crystal device comprising the steps of:

a. providing first and second optically clear substrates, each substrate having a first side, a second side, and a first edge;

b. cleaning said substrates;

c. coating said first side of one of said substrates with polyimide and curing said polyimide coating by heating;

d. coating said first side of the other of said substrates with amorphous fluoropolymer, and curing said amorphous fluoropolymer by heating;

e. rubbing said first sides of said substrates to create microgrooves in the coatings, essentially parallel to said first edge of the rubbed substrates;

f. placing spacer bars having equal thickness on said first side of said one of said substrates;

g. heating the first side of said one of said substrates;

h. preparing the CLC material;

i. spreading a layer of CLC material on said first side of said one of said substrates;

j. placing said first side of said other of said substrates on said CLC material such that said microgrooves are substantially parallel, forming a substrate-CLC-substrate sandwich;

k. heating said sandwich sufficiently to anneal said CLC material to said polyimide coating;

l. cooling said sandwich; and m. carefully separating said amorphous fluoropolymer coating and its substrate from said CLC layer which is affixed to said polyimide coating, whereby said annealed CLC material is totally supported by a single substrate.

3. Said method of claim 2 in which said first coating step includes spin coating polyimide onto one of said substrates.

4. The method of claim 2 in which said first coating step applies polyimide to a one of said substrates to a depth of approximately 1000 Angstroms.

5. The method of claim 2 in which said substrates are glass.

6. The method of claim 5 in which said glass substrates are approximately 5 mils thick.

7. The method of claim 2 in which said first coating step employs a polyimide which is a 6% solution by weight in a solvent.

8. The method of claim 7 in which said first coating step employs polyimide suspended in a 1-methyl-2-pyrolidinone solvent.

9. The method of claim 2 in which said polyimide coating curing step heats said polyimide to at least 250° Celsius in the range between 250° and 400° Celsius.

10. The method of claim 2 in which said rubbing step is performed by a machine set at approximately one pound of pressure as lasts for one minute.

11. The method of claim 2 in which the microgrooves formed by said rubbing step uniformly extend over said entire first surface of each substrate, essentially parallel to said edge.

12. The method of claim 2 in which said microgrooves formed by a rubbing range in depth from about 15 to about 20 Angstroms.

13. The method of claim 2 in which said second coating step spin coats amorphous fluoropolymer onto said other substrate, and heats the coated substrate to 150°–160° C. so as to cure amorphous fluoropolymer layer.

14. The method of claim 2 in which said second coating step applies amorphous fluoropolymer to a thickness of approximately 1000 Angstroms.

15. The method of claim 2 in which said heating step anneals said sandwich at a temperature of approximately 95°–160° Celsius for approximately 30 minutes.

16. The method of claim 2 in which said spreading step applies the cholesteric liquid crystal layer to said first substrate.

17. A method of manufacturing a cholesteric liquid crystal device comprising the steps of:
   a. providing a first and a second 5 mil thick glass sheet, each sheet having a first side, a second side, and a first edge;
   b. cleaning said glass sheets;
   c. spin coating polyimide to a depth of 1000 Angstroms to said first side of said first sheet and heating said polyimide coated sheet to a temperature within the range of 250°–400° C.;
   d. spin coating amorphous fluoropolymer to a depth of 1000 Angstroms on said first side of said second sheet, and heating said amorphous fluoropolymer coated sheet to about 150°–160° C.;
   e. rubbing said first sides of said sheets to create essentially parallel microgrooves with a depth ranging from approximately 15 to 20 Angstroms;
   f. placing spacer bars on said first side of said first sheet;
   g. spreading a layer of cholesteric liquid crystal on said first side of said first sheet;
   h. placing said second sheet first side on said layer of cholesteric liquid crystal with said microgrooves in said polyimide and amorphous fluoropolymer layers substantially parallel, to form a sheet cholesteric-liquid-crystal sandwich;
   i. heating said sandwich to 150° C. for 30 minutes to evaporate solvents and for annealing said cholesteric liquid crystal layer to said polyimide coated sheet;
   j. cooling said sandwich to approximately 90° C.; and
   k. removing said amorphous fluoropolymer coated glass sheet from said sandwich, leaving said cholesteric liquid crystal layer affixed to said polyimide coated sheet.

18. A method for preparing cholesteric liquid crystal material for use in a cholesteric liquid crystal device comprising the steps of:

dissolving cholesteric liquid crystal material in tetrahydrofuran creating a mixture;

filtering the mixture;

heating the mixture to about 80°–100° C.; and removing all air from the heated mixture.

19. A method for preparing cholesteric liquid crystal material as claimed in claim 18 wherein the step of removing the air further comprises the steps of:

placing the mixture in a vacuum oven; and heating the mixture until air bubbles stop evolving.

* * * * *